Patented Apr. 29, 1941

2,240,437

UNITED STATES PATENT OFFICE 2,240,437

COMPOSITION FOR HYDRAULIC SYSTEMS

Ivor M. Colbeth, East Orange, N. J., assignor to The Baker Castor Oil Company, Jersey City, N. J., a corporation of New Jersey No Drawing. Application December 15, 1938, Serial No. 245,913

9 Claims. (Cl. 252—79)

This invention relates to liquid compositions for use in connection with fluid pressure operated devices, such as hydraulic brake systems for automobiles, etc., for transmitting the pressure. This is a continuation in part of my application Serial No. 220,455, filed July 21, 1938, now Patent No. 2,168,325. Reference is made to my Patent No. 2,133,080.

A liquid composition for such purposes can be prepared in accordance with the present invention which possesses the desirable properties to a remarkable extent and does not require extraordinarily expensive materials or very complicated chemical processes. The type of chemical reactions used for preparing the ingredients are well known and the materials used are readily procurable, although the process for preparing the composition in a particular way is improved.

Fluid compositions for use in fluid pressure operated devices should possess the desirable properties of not freezing or becoming too viscous at low temperatures or having portions settle out, should be free from decomposition at high temperatures, should not have any acids or other ingredients therein that would attack metals, should be capable of being diluted with diluents in which the fluid should be soluble, which diluents themselves do not possess properties that would be objectionable in such hydraulic pressure fluids, should have a high boiling point and low vapor pressure, should have a reasonably uniform viscosity at different temperatures, low cost and ease of manufacture, and should not swell or otherwise injuriously affect rubber.

In carrying out this invention an ester is used which is an acetylated ester of an acid of the chain series, which acid preferably has about 18 carbon atoms and a mono-, di- or tri-hydroxy alcohol or derivatives of such alcohols. The acid may be acetylated before the ester is formed with the alcohol, or the ester itself may be acetylated after it has been formed, by methods already known. The acetylation should be caused to take place at some portion of the chain of the acid or acid radical other than at the carboxyl group or end of the chain, or in cases where the acetylization has been caused to take place after the ester has been formed by using a polyhydric alcohol this acetylization may take place at one or more of the unreacted hydroxyl groups of the alcohol radical. A mixture of such acetylated esters may be used, and acid radicals should replace all of the H atoms of the hydroxyls of the monohydric alcohol and an H atom in at least one of the hydroxyls of each polyhydric alcohol molecule in forming the acetylated esters.

The underlying principle of this invention is that the esters that are present in the composition are esters that have acetyl groups, $CH_3CO$, substituted for H atoms of hydroxyl groups that are attached to carbon atoms of the chain of the acid radicals or for H atoms of the hydroxyl groups of the polyhydric alcohol radicals, or both, which carbon atoms in turn do not have oxygen atoms attached thereto by double bonds, and the acid radicals are substituted for H atoms of the hydroxyls of the alcohols.

Among a very large number of acids that are suitable may be mentioned ricinoleic, hydroxystearic, dihydroxy stearic and ricinic acid, which are especially suitable, and among the large number of alcohols that are suitable may be mentioned methyl, ethyl, butyl, isopropyl, glycols, such as ethylene, diethylene and triethylene glycols, glycerol, and other mono-, di-, and trialcohols of the fatty acid series which are especially suitable for this invention.

The esters are mixed with a diluent to form the composition that is to be used. The diluent should have a low viscosity and a low freezing point. The diluent that is used dissolves at least a portion of the ester, although it is not necessary for each one of the constituents of the diluent to be a solvent for the ester. It has been found that aliphatic alcohols, such as methyl, ethyl, butyl, isopropyl, etc., and mixtures of the same which have low viscosity and low freezing points, are suitable. Each one of the mono ethers of diethylene glycol, such as the methyl, ethyl or butyl ether for example, mixed with diacetone alcohol have been found to be particularly suitable as the diluent, although these ethers do not dissolve the esters. The diluents may also be mixtures of alcohols such as, propyl, butyl, and diacetone alcohol, for example which dissolve the esters with alcohols such as methyl, and ethyl alcohol, and ethylene glycol and diethylene glycol, for example, which do not dissolve the esters.

The following is given as a specific example of carrying out the invention, but it is to be understood that it is given for illustrative purposes and that the invention is not limited to the particular materials, time, temperature, etc., given in this example.

*Example 1.*—Isobutyl ricinoleate is prepared from castor oil by treating one part by weight of castor oil with about two parts of isobutyl alcohol using sulphuric acid as a catalyst. The mixture is refluxed for about four hours. The sulphuric acid is removed by addition of calcium carbonate, and the calcium sulphate formed in the mixture is separated by filtration. The excess alcohol is removed by distillation.

The isobutyl ricinoleate so formed is treated with about an equal weight of acetic anhydride of at least 92% strength at a temperature of about 118° C. for approximately two hours while the acetic anhydride that condenses in the reflux condenser is returned to the mixer. The mixture is then freed from excess acetic anhydride and acetic acid that is formed during the reaction, by distilling under vacuum, or is removed in any other convenient way. The last traces of acetic acid can be removed by passing a current of superheated steam through the mixture until the condensed steam is free from acidity. The product thus formed is acetylated isobutyl ricinoleate. This acetylated product can be heated for several hours to a temperature of 250° C. without any appreciable decomposition. This product can then be dissolved in any of the common alcohols such as those mentioned above for example and the composition is ready for use. The composition so prepared can be kept at a temperature below −35° C. indefinitely without freezing or becoming too viscous to be used in hydraulic pressure systems, and also without crystallizing.

The acetylated ester to be used in the composition may be produced by first acetylating the hydroxy fatty acid and esterifying the acetylated product or the acid may first be esterified and the ester acetylated, or the acetylization and esterification may be carried out at the same time. If the acetylization occurs while unreacted alcohol is present, the acetylated portion thereby formed should be removed.

A very convenient method of making the composition in condition for use is to acetylate the hydroxy fatty acid and then esterify it in the presence of a sufficient amount of the alcohol to form the ester of the acetylated product and to dissolve the same.

What is claimed is:

1. A liquid composition for fluid pressure systems comprising an ester of an acetylated hydroxy fatty acid and an alcohol, together with a diluent which is more of said alcohol and has a low viscosity and a low freezing point and is a solvent of said ester, the acetylation being at a hydroxyl group that was not in a carboxyl group.

2. The process of producing a liquid composition for fluid pressure systems which comprises heating a hydroxy fatty acid in the presence of a sufficient amount of acetic anhydride to substitute the H atoms of hydroxy groups not in carboxyl groups and also in the presence of enough alcohol to esterify the acid and dissolve the acetylated product.

3. The process of producing a liquid composition for fluid pressure systems which comprises treating an acetylated hydroxy fatty acid with enough alcohol to esterify the acid and dissolve the resulting product.

4. The process of producing a liquid composition for fluid pressure systems which comprises treating an acetylated ricinoleic with enough alcohol to esterify the acid and dissolve the resulting product.

5. The process of producing a liquid composition for fluid pressure systems which comprises treating an acetylated hydroxy fatty acid with enough monohydric alcohol to esterify the acid and dissolve the resulting product.

6. A liquid composition for fluid pressure systems comprising an alcohol and an ether and a substantially completely acetylated ester of a hydroxy fatty acid and an alcohol, the acetylization being at a hydroxyl group that was not in a carboxyl group.

7. A liquid composition for fluid pressure systems comprising a substantially completely acetylated ester of a hydroxy fatty acid and an alcohol, the acetylization being at a hydroxyl group that was not in a carboxyl group, and also comprising at least two alcohols one of which is a solvent for said ester and another is a nonsolvent for said ester.

8. A liquid composition for fluid pressure systems comprising a substantially completely acetylated ester of a hydroxy fatty acid and an alcohol, the acetylization being at a hydroxyl group that was not in a carboxyl group, and also comprising diacetone alcohol and diethylene glycol mono ethyl ether.

9. A liquid composition for fluid pressure systems comprising ethylene glycol and a substantially completely acetylated ester of a hydroxy fatty acid and an alcohol, the acetylization being at a hydroxyl group that was not in a carboxyl group.

IVOR M. COLBETH.